Dec. 15, 1964    R. W. SMITH    3,161,304
ANTI-FOUL DRIVE WHEEL FOR SILO UNLOADER
Filed July 24, 1963

INVENTOR.
ROBERT W. SMITH
BY Stanley Binish
ATTORNEY

United States Patent Office 3,161,304
Patented Dec. 15, 1964

3,161,304
ANTI-FOUL DRIVE WHEEL FOR SILO UNLOADER
Robert W. Smith, Kaukauna, Wis., assignor to Badger Northland, Inc., Kaukauna, Wis., a corporation of Wisconsin
Filed July 24, 1963, Ser. No. 297,423
4 Claims. (Cl. 214—17)

This invention relates generally to silo unloaders and more particularly to a novel anti-foul drive wheel for silo unloaders.

The purpose of this invention is to provide an improved silo unloader drive wheel which eliminates the encrustation, buildup, and snowballing of silage onto the conventional drive wheel, resulting from the freezing of silage thereon, and the consequential operational impairment of such drive wheel by such adhering and fouling silage.

An object of this invention is to provide a drive wheel, for a silo unloader, which is not subject to fouling, such as adhering and snowballing of silage into a mass thereon.

Another object is to provide a novel drive wheel for a silo unloader, said drive wheel having a relatively low thermal conductive concrete core and a high thermal conductive casing around such core.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
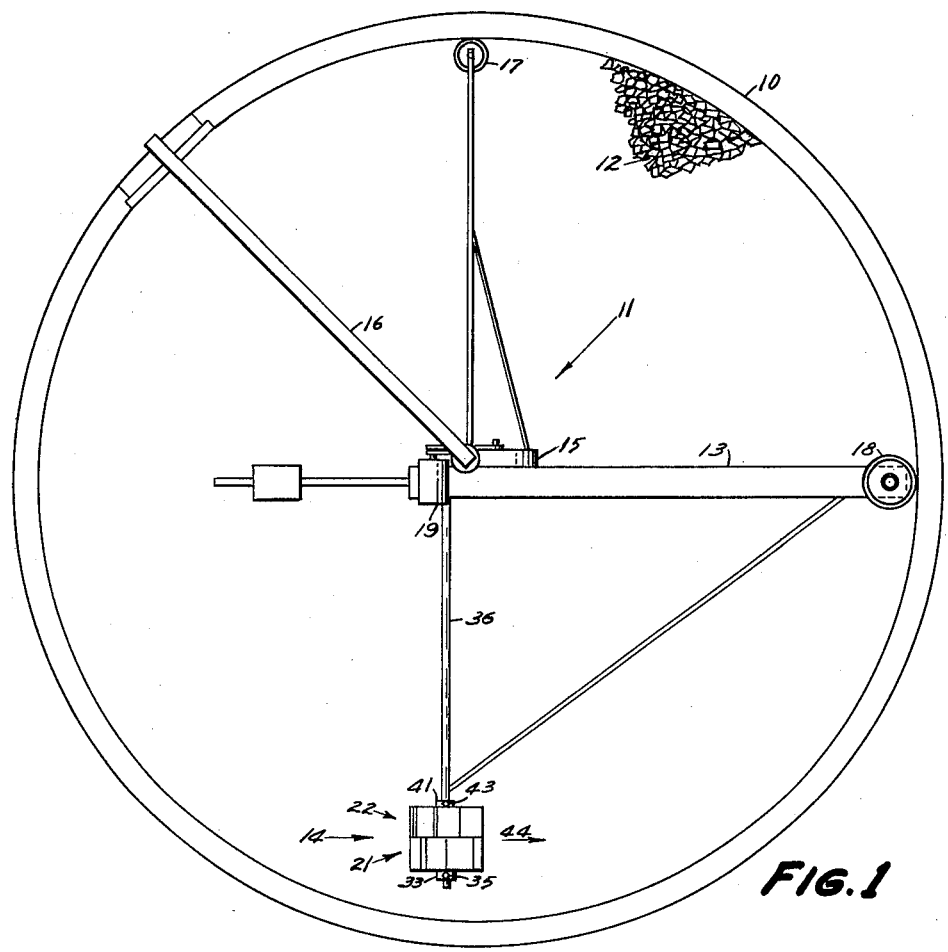
FIG. 1 is a plan view of a silo unloader operable on silage in a silo, and including the improved drive wheel of the present invention.
Figure 2:
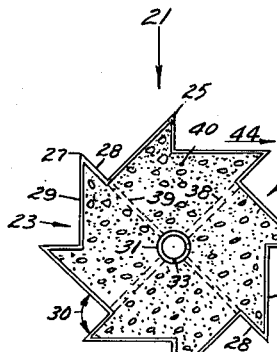
FIG. 2 is an enlarged side elevation view of the drive wheel included in FIG. 1.
Figure 3:
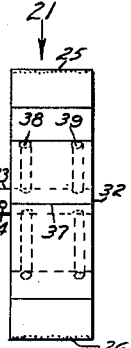
FIG. 3 is a front elevation view of the drive wheel of FIG. 2.
Figure 4:
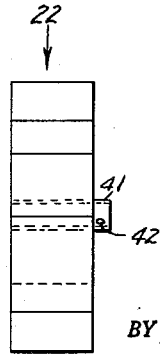
FIG. 4 is a front elevation view similar to FIG. 3, but showing the sleeve bearing or hub extending from the opposite side of the wheel.

Referring now to the drawings, wherein like reference characters designate like or corresponding parts throughout the several views, there is shown a hollow cylindrical silo structure 10 having a conventional silo unloader, except for the drive wheel, generally indicated at 11, operably disposed on the upper surface of silage, indicated at 12, in said silo.

The silo unloader 11 comprises: a gathering arm means 13 for engaging the surface of silage in a silo and feeding the resulting loosened silage toward the center of the silo, said gathering means being journalled at its inner end for rotation about a vertical axis; drive wheel means generally indicated at 14 for rotating said gathering means about its vertical axis; blower means 15 adapted to receive silage delivered by said gathering arm means and to discharge the silage from the silo through means of a spout 16; advance guide wheel means 17 positioned ahead of said gathering arm 13; a silo wall engaging wheel 18 on the outer end of said gathering arm; and motor means 19 for driving said gathering means, blower and drive wheel.

The drive wheel means 14 comprises a pair of substantially similar wheels generally indicated at 21 and 22, see FIG. 1.

Drive wheel 21 comprises a hollow cylinder-like sheet metal rim or casing consisting of two equal sectors generally indicated at 23 and 24, welded together at their ends as at 25 and 26 to form a continuous rim or casing. The casing is made from bands of sheet metal, of about 14 gauge thickness, having a relatively high heat conductivity, such as steel or the like. Obviously, the invention is not limited to steel or the above indicated gauge thickness. Any material or thickness, suitable for the hereinafter described functions, is satisfactory.

Projecting asymmetrical angular teeth, such as indicated at 27, are pressed and formed from the casing. Said teeth are formed parallel to the axis of the casing, and extend across the entire width of the casing. The front faces of such teeth are substantially radially aligned such as indicated at 28, and the back faces thereof, such as indicated at 29, slope backwardly and downwardly to the base or inner end of the front face of the adjacent following tooth to form substantially a ninety degree angular relationship therewith as indicated at 30.

A sleeve bearing or hub 31 is disposed axially of said casing, one end of said bearing, such as indicated at 32, is disposed flush with the plane of the corresponding side of the casing; and the other end of said bearing, such as indicated at 33, projects beyond the plane of the corresponding side of the casing. The projecting end 33 is provided with a diametral bore 34 to receive a pin 35, for securing the drive wheel to drive shaft 36. Said bore is aligned with tooth face 37.

Two spaced banks of reinforcing members such as radial rodular spokes indicated at 38 and 39 extend from the sleeve bearing to the casing and are secured thereto as by welding, the spokes contacting the casing at the bases of the teeth, respectively.

The space between the casing and the sleeve bearing is filled with a low thermal conductive material such as a relatively dry mix of rich Portland cement concrete 40, flush with the side planes of said casing, and allowed to harden, the spokes being embedded in such concrete core, and the concrete being bonded to the casing and sleeve bearing.

A twin arrangement of such drive wheels can be used in side by side relation, such as wheels 21 and 22, see FIG. 1. Companion drive wheel 22 is similar to drive wheel 21 except that the hub extension portion 41 of wheel 22 projects from the opposite side of the wheel from that of wheel 21. Also, a securement bore 42 is provided to operatively receive pin 43 and secure wheel 22 to drive shaft 36. The wheels are related so that the teeth on one of the wheels leads the other by approximately twenty-two and one-half degrees.

In general operation the drive wheel is drivably mounted singly, or in pairs with one leading the other by approximately 22½°, on silo unloader drive shaft 36, so that the front faces 23 of the teeth lead in rotation around the wheel. Upon motor 19 being started, the drive wheel will advance, on the silage, in the direction of arrow 44, and thereby operably actuate the gathering arm 13 in rotation about a vertical axis at its inner end.

Assuming frigid silage-freezing weather conditions and the hereinbefore described novel anti-foul drive wheel drivably connected with the aforementioned silo unloader and operably disposed on frozen silage in a silo; and assuming that at the outset the temperature of the novel anti-foul drive wheel is the same as the temperature of the frozen silage, as would be the case when a silo unloader stands overnight in the silo and on the top of the frozen silage, ready to unload silage for the morning feeding.

As the silo unloader proceeds over the frozen silage, loosening and conveying same to the center of the silo for discharge therefrom, the anti-foul drive wheel has no adhesive freezing affinity for the frozen silage because both the wheel and frozen silage are of substantially the same temperature, namely, there exists no freezing temperature differential between the two, and the drive wheel remains substantially free and clean of silage encrustation during such initial stage of operation.

However, as the frozen top or crust of the silage is removed, the relatively warmer and moist lower silage is progressively exposed. As the drive wheel proceeds over the progressively warmer silage, the thin steel casing thereof absorbs heat from the silage and currently acquires substantially the same temperature as the warm silage. The thermal conductivity of the thin steel casing being much higher than the thermal conductivity of the concrete core, the concrete core acts as a thermal insulator barrier, and the heat transfer from the warm silage is limited to a great extent to and concentrated in the thin steel casing of small mass. The thermal conductivity of concrete is only about one sixty-fifth of the thermal conductivity of steel.

As a result, the thin steel casing quite rapidly assumes substantially the temperature of the warm moist silage, and consequently there is practically no freezing temperature differential between them and no freezing of such warm moist silage onto the warmed steel casing of the moving drive wheel, and the drive wheel operates quite free and clean of silage adherence and encrustation.

Whereas, the conventional thick walled, or solid cast iron or steel drive wheel, due to its considerably greater metal mass, has a high heat capacity. Such an iron drive wheel, of high heat absorption capability, quite slowly rises in temperature and remains comparatively thermally unchanged and cold relative to the warm moist silage. As a result of such freezing temperature differential, the moist silage often freezes onto the cold moving iron wheel and builds up thereon impairing its operability.

If two different masses of a substance, such as iron, are exposed for the same length of time in just the same way to a steady source of heat, it will be found that the temperatures of the two will have risen inversely in proportion to their masses.

After a sufficient quantity of silage has been loosened, gathered and discharged from the silo, the operator stops the operation of the silo unloader through control means located at the base of the silo, and the unloader is disposed at rest until the next feeding time which may result in an overnight immobility of the unloader in the frigid environment.

During such immobile period the freezing of the hereinbefore described moist silage onto the underside of the conventional iron wheel commences almost immediately and quite rapidly because of the sustained freezing temperature of such relatively massive iron wheel.

However, the freezing of the moist silage unto the immobile anti-foul drive wheel is not so immediate and comparatively very much slower because (1) the thin casing is somewhat warmed by its previous moving contact over the moist silage, (2) the cooling of the casing portion bearing on the silage proceeds slowly because the moist silage tends to give up heat to such casing portion, while the wheel is at rest thereon, and effectively tends to sustain the temperature of such casing portion, and (3) the insulative concrete core of the wheel thermally insulates such casing portion from the frigid ambient atmospheric temperature, and also acts as an insulating barrier to heat tending to escape upwardly from such underside casing portion.

As a consequence, the casing portion of the novel antifoul wheel bearing on the silage, at rest, cools very slowly to a final freezing temperature, as distinguished from the relatively quick freeze action that takes place on the corresponding portion of a conventional iron drive wheel.

Rate of cooling and freezing influences crystal size; and crystal size influences mechanical properties such as toughness and strength.

Rapid freezing promotes small crystals, a fine grain texture, and a strong structure.

Slow freezing promotes large crystals, a coarse grain texture, and a relatively weak structure.

Therefore, the comparative rapid freezing of the silage onto the bottom portion of the stopped conventional iron drive wheel produces a strong freeze-bonding of the silage to said drive wheel, and the subsequent rolling action of such silage-fouled drive wheel has little breaking effect on the frozen silage mass thereon.

Whereas, the relatively slow freezing of the silage onto the bottom portion of the novel anti-foul drive wheel produces a relatively weak freeze-bonding of the silage to such drive wheel, and the subsequent rolling action of such drive wheel causes the attached silage to be quite easily shattered and broken from such wheel, leaving such wheel relatively unfouled.

Obviously many modifications and variations of the present invention are possible in the light of the above teachings. It is therefore to be understood, that within the scope of the appended claims, the invention may be practiced otherwise than as specifically described.

What is claimed and desired to be protected by Letters Patent of the United States is:

1. In a silo unloader having a drive wheel operably engageable with the surface of silage in a silo, said drive wheel comprising, a high thermal conductive outer rim of a thinness to require internal support to give rigidity to said rim; hub means for said rim; and a rigid relatively low thermal conductive core disposed in the space between said hub means and said rim and engaged with the inner periphery of said rim to provide rigidity to said rim.

2. The apparatus of claim 1 wherein the rim is steel and the core is Portland cement concrete.

3. The apparatus of claim 1 wherein the rim is metal and the core is concrete.

4. In a silo unloader having a drive wheel operably engageable with the surface of silage in a silo, said drive wheel comprising, a metallic outer rim of approximately 14 gauge thinness having a relatively high coefficient of thermal conductivity; hub means for said rim; and thermal insulation means, having a relatively low coefficient of thermal conductivity, disposed adjacent the inner periphery of said rim to substantially cover said inner periphery.

References Cited by the Examiner
UNITED STATES PATENTS

| | | | |
|---|---|---|---|
| 996,945 | 7/11 | Sharick | 74—230.8 |
| 2,888,253 | 5/29 | Van Dusen | 214—17 X |

HUGO O. SCHULZ, *Primary Examiner.*